United States Patent
Swain et al.

[15] 3,689,154
[45] Sept. 5, 1972

[54] WEB TRANSPORT SYSTEM PARTICULARLY FOR HIGH RESOLUTION PHOTOGRAPHIC PRINTING

[72] Inventors: James Bert Swain, Weston; David Jeffries, Wilton, both of Mass.

[73] Assignee: Baird-Atomic, Inc., Bedford, Mass.

[22] Filed: Dec. 28, 1970

[21] Appl. No.: 101,460

[52] U.S. Cl. .........................355/97, 355/92, 355/96
[51] Int. Cl. ..............................................G03b 27/04
[58] Field of Search..........355/89, 90, 92, 95, 96, 97, 355/99, 102; 352/159

[56] References Cited

UNITED STATES PATENTS

| | | | |
|---|---|---|---|
| 2,943,554 | 7/1960 | Kastner | 355/97 UX |
| 3,169,465 | 2/1965 | Patterson | 355/91 X |
| 3,318,219 | 5/1967 | Anderson | 355/91 X |
| 3,320,867 | 5/1967 | Miller | 355/92 |
| 3,408,144 | 10/1968 | Cowan | 355/48 |
| 3,409,365 | 11/1968 | Moorhusen et al. | 355/96 X |

FOREIGN PATENTS OR APPLICATIONS 133,484  9/1902  Germany......................355/92

Primary Examiner—John M. Horan
Assistant Examiner—Alan A. Mathews
Attorney—Morse, Altman & Oates

[57] ABSTRACT

A web transport sm particularly adapted for use in high resolution photographic printing comprises precise servo systems for feeding, advancing, and taking up negative and copy film and a photographic subsystem for making exposures. A precise feed servo subsystem includes idler air bearings, drive capstans, and digital to analog encoders for advancing negative and copy films. A reel servo subsystem includes feed and take-up spools for supplying and collecting negative and copy films and vacuum wells for maintaining constant tension on the films.

12 Claims, 7 Drawing Figures

INVENTORS
JAMES B. SWAIN
DAVID JEFFRIES
BY
ATTORNEYS

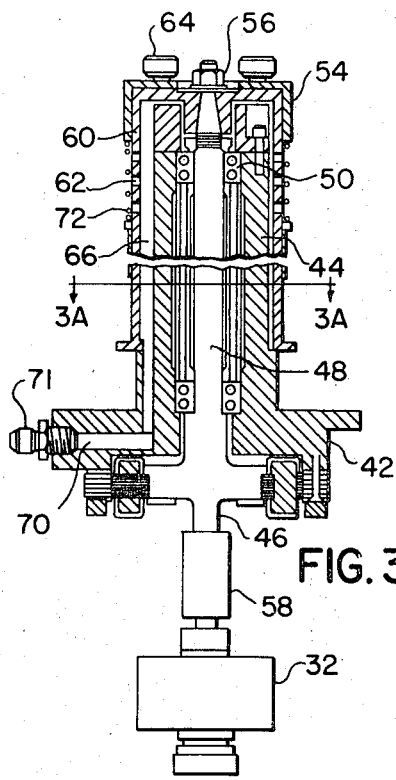
FIG. 3
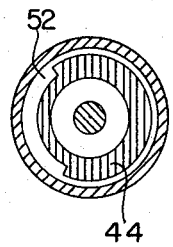
FIG. 3A
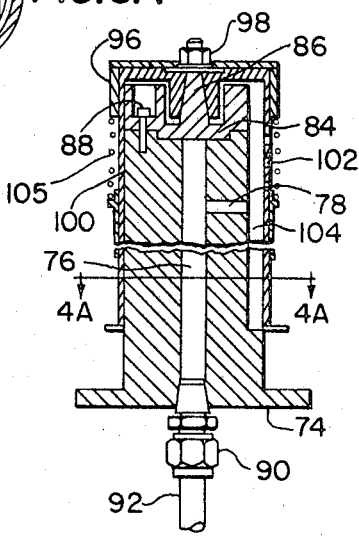
FIG. 4
FIG. 4A
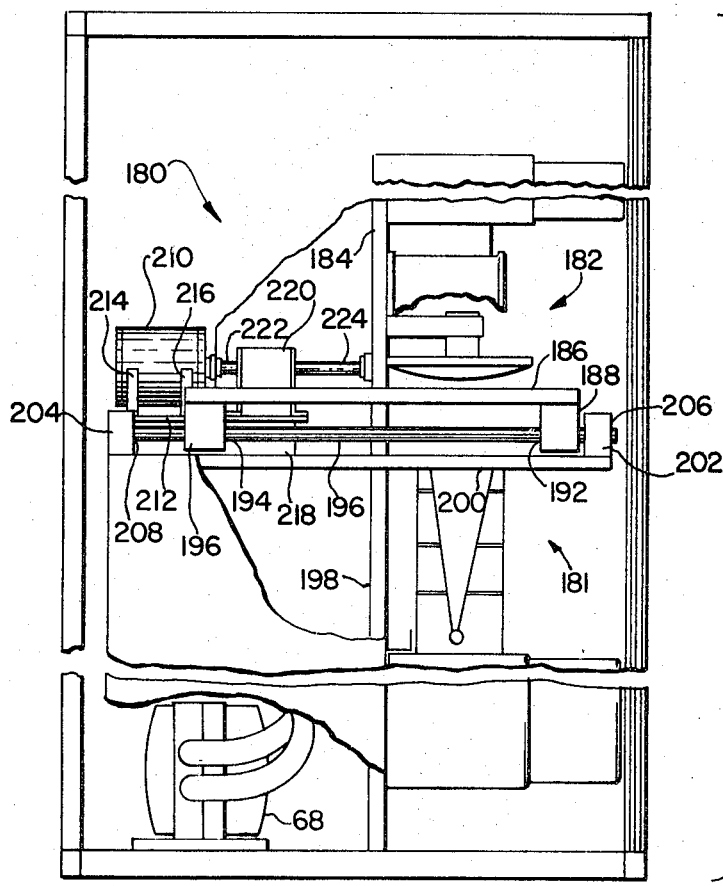
FIG. 5
INVENTORS
JAMES B. SWAIN
DAVID JEFFRIES
BY
*Morse, Allman & Oates*
ATTORNEYS

WEB TRANSPORT SYSTEM PARTICULARLY FOR HIGH RESOLUTION PHOTOGRAPHIC PRINTING

BACKGROUND OF THE INVENTION

1. Field of the Invention

The invention relates to web transport systems and more particularly to such systems adapted for use in high resolution photographic printing systems.

2. Description of the Prior Art

Various web transport systems have been proposed for use with high resolution photographic systems in order to accurately position negative and copy film in a printing gate. One type of photographic system utilizes the step-and-repeat technique in which the exposure time is substantially shorter than the dwell time of the film in the printing gate. Various web transport systems have been designed for perfecting the step-and-repeat technique in order to increase resolution of the reproduced negative. These systems are unduly complex in construction and costly in production.

SUMMARY OF THE INVENTION

An object of the present invention is to provide a web transport system particularly adapted for use in a high resolution photographic system characterized by a precise feed servo, a photographic, and a reel servo subsystems. Original negative material from a supply spool is threaded sequentially in a path defined by an idler roller, a vacuum well, an idler air-bearing, an exposure platen, a drive capstan, a vacuum well an idler roller, and a take-up spool. Copy film from a supply spool is threaded sequentially in a path defined by an idler roller, a vacuum well, an idler air-bearing, the exposure platen, a drive capstan, a vacuum well, an idler roller, and a take-up spool. Each idler air-bearing is formed with an arcuate chamber and a plurality of ports communicating with the chamber, pressurized air is vented through the ports so that an air-bearing is created for the film. Each of the drive capstans is formed with an arcuate chamber and a plurality of ports communicating with the chamber, air is evacuated from the chamber so that a vacuum grip is created for engagement of the negative and copy film. The vacuum wells provide a constant tension on the negative and copy film. A cushion in register with the negative, copy film and exposure platen is provided for urging the negative and copy film against the exposure platen during the printing cycle. A lateral drive system is provided for aligning the part of the negative to be printed with the copy film. A photographic subsystem and a chip identification subsystem are provided for making exposures and identifying each print, respectively. An electronic subsystem is provided for controlling the photographic subsystem, chip identification subsystem, and a combination analog and digital servo which governs advancement of the negative and copy film with respect to the exposure platen. The combination of precise feed servo subsystem, photographic subsystem and reel servo subsystem is such as to provide a flexible and expeditious web transport system.

The invention accordingly comprises the web transport system possessing the construction, combination of elements, and arrangements of parts that are exemplified in the following disclosure, the scope of which will be indicated in the appended claims.

BRIEF DESCRIPTION OF DRAWINGS

For a fuller understanding of the nature and objects of the present invention, reference should be had to the following detailed description of the preferred embodiment depicted in the accompanying drawings wherein:

FIG. 3 is a top sectional of a drive capstan of FIG. 1;

FIG. 3A is a section taken along the lines 3A—3A of FIG. 3;

FIG. 4 is a top sectional of an idler capstan of FIG. 1;

FIG. 4A is a section along the lines of 4A—4A of FIG. 4; and

FIG. 5 is a side elevation of the printer of FIG. 1.

DETAILED DESCRIPTION OF THE PREFERRED EMBODIMENT

The web transport system embodying the present invention is particularly adapted for use in a high resolution printing system. Accordingly, the detailed description is directed toward a printing system having a web transport system made according to the invention. The printing system is essentially an automated step-an-repeat printer particularly suited for either chip reproduction or high-resolution reproduction of any length of a photographic transparency, negative or positive. By way of example, the photographic transparency will hereinafter be called negative. In the chip reproduction mode, any part of the original negative may be reproduced, and as many chips as desired made of each part. In the other mode, where lengths of original negative are reproduced, adjacent print frames are accurately registered so that the print preserves the high resolution of individual chips, with only a very narrow frame spacing, typically of the order of 0.001 inch between frames to distinguish it from a continuous print. The printer is designed as a self-sufficient unit capable of operation in a semiautomatic mode with manual data input. The printer may be operated also in an automatic mode with a suitable interface unit for example, a computer, paper tape, magnetic tape, and the like. Conventional photographic techniques are employed for developing and fixing the copy film.

Figure 1:
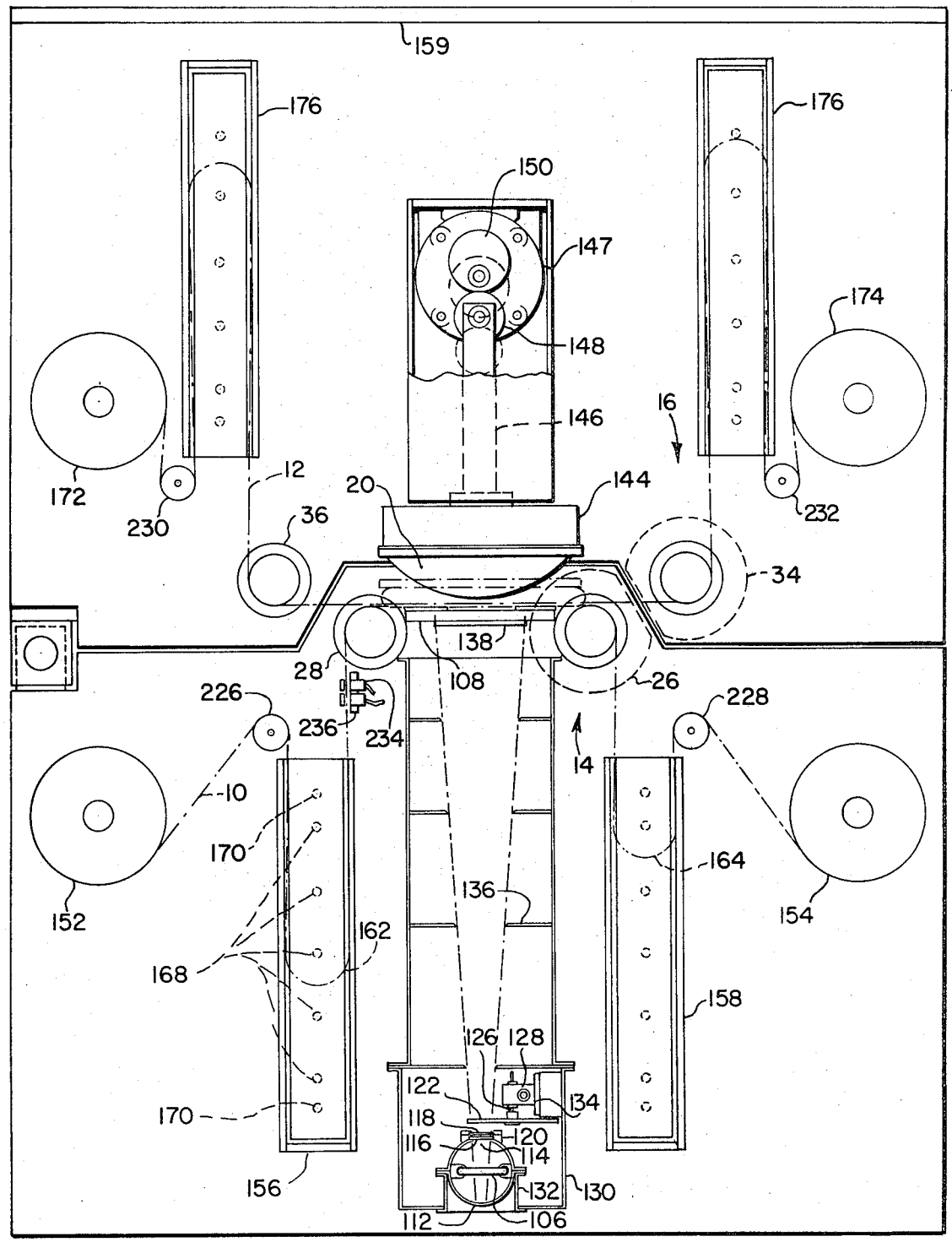
FIG. 1 is a front elevation of a high resolution photographic printer embodying the present invention.
Figure 2:
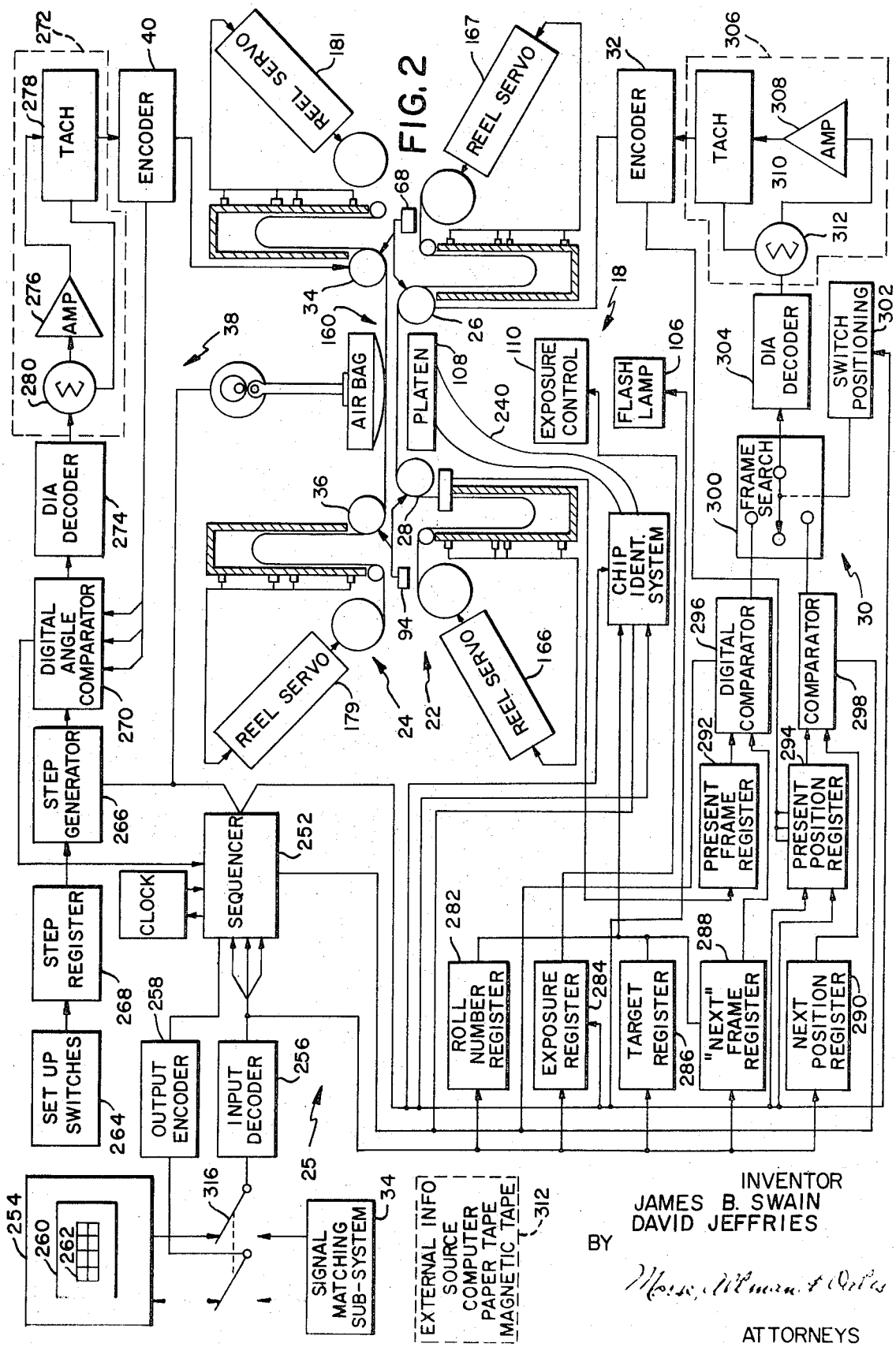
FIG. 2 is a block diagram, somewhat pictorial, of a system embodying the present invention.

Generally, the printing system of FIGS. 1 and 2 is comprised of film feed servo subsystems 14 and 16 for advancing negative 10 and copy film 12, respectively, a photographic subsystem 18 for making exposure, a cushion 20 for bearing 10 and 12 against each other, reel servo subsystems 22 and 24 for controlling the feeding and taking-up of negative 10 and copy film 12, respectively, and a programmer 25 for controlling the operation of the printer.

Film feed servo subsystem 14, which feeds negative 10 a precisely predetermined distance, is comprised of a drive capstan 26 and an idler capstan 28. Drive capstan 26 utilizes a vacuum to grip negative 10 whereby angular rotation of the capstan is converted to linear motion of the film. Idler capstan 28 uses air pressure to provide a substantially friction-free air-bearing for negative 10. The motion of drive capstan 26 is controlled by a combination analog and digital servo 30, which provides for approximate analog control of acceleration and precise digital control of the final position of negative 10. Drive capstan 26 is connected to an encoder 32, for example a 14-bit encoder. In the preferred embodiment, the circumference of drive capstan 26 is five inches so that each encoder increment corresponds to a linear displacement of negative 10 of 0.00061 inch. Film feed servo subsystem 16 is comprised of a drive capstan 34, an idler capstan 36, a combination analog and digital servo 38 and an encoder 40. Film feed servo 16 is identical to film feed servo 14, the former being used for advancing copy film 12 and the latter for advancing negative 10. Drive capstan 34, idler capstan 36, servo 38 and encoder 40 are identical with drive capstan 26, idler capstan 28, servo 30 and encoder 32, respectively. The details of drive capstan 26 and idler capstan 28 are shown in FIGS. 3 and 4, respectively.

Referring to FIG. 3, it will be seen that motor driven capstan 26 includes a stator 42 having a fixed axially extending cylindrical member 44 and a rotor 46 having a shaft 48 extending coaxially and concentrically through member 44, shaft 48 being rotatably mounted to member 44 via bearings 50. Member 44 is cut away at 52 to form an arcuate recess as best shown in FIG. 3A. One end of shaft 48 carries a hub 54 which is affixed thereto by a fastener 56 and the other end is drivingly connected to encoder 32 via a coupling 58. A sleeve 60, formed with a plurality of ports 62, is affixed to hub 54 via fasteners 64 in such a manner that a longitudinally extending arcuate chamber 66 is formed between sleeve 60 and the cutaway section of member 44. Chamber 66 communicates with a vacuum source 68 via a passageway 70 and a connector 71. A plurality of annular guides 72 are mounted to sleeve 60 in juxtaposition with ports 62 for maintaining a fixed spatial relation between sleeve 60 and negative 10 which engages drive capstan 26 opposite chamber 66.

Referring now to FIG. 4, idler capstan 28 includes a cylindrical member 74 formed with a central core 76 and an aperture 78. Member 74 is cut away at 82 to form an arcuate recess as best shown in FIG. 4A. A plug 84, having an extension 86, is affixed to member 74 by a fastener 88 whereby one end of core 76 is sealed. The other end of core 76 is provided with a connector 90 which is adapted for reception of a pressure hose 92 from an air supply 94. A hub 96 is affixed to extension 86 by a fastener 98. A sleeve 100, formed with a plurality of ports 102, is secured about member 74 by the vise-like action of hub 96 and plug 84 in such a manner that a longitudinally extending arcuate chamber 104 is formed between sleeve 100 and the cutaway section of member 74. A plurality of annular guides 105 are mounted to sleeve 100 in juxtaposition with ports 102 for maintaining a spatial relationship between negative 10 and sleeve 100. Air applied to chamber 104 from air supply 94 via hose 92, core 76 and aperture 78 is exhausted through ports 102 whereby an air-bearing is provided for movement of negative 10 which engages idler capstan 28 opposite chamber 104.

Photographic subsystem 18 is comprised of a lamp 106, an exposure platen 108 and an exposure control 110. Lamp 106, for example a circular flash tube, is encircled by a more or less spherical diffusing chamber 112 having an aperture 114 in register with platen 108 and flash tube 106. An optical window 116 and an optical balancing wedge 118 are mounted in a support 120 which is affixed about aperture 114, window 116 being interposed between wedge 118 and flash lamp 106. Exposure control 110 includes an iris diaphragm, or in lieu of an iris diaphragm, a neutral density circular wedge 122 for governing the amount of light reaching platen 108. In alternate embodiments, the exposure control includes a neutral density rotary wedge and a balancing wedge, or two rotary wedges oppositely oriented and counter-rotated, each wedge being variable over a density range of 2.0 so that light can be attenuated by any factor up to 10,000. In the preferred embodiment, the variable density wedges provide a continuous 100:1 range of exposing intensity to permit optimum exposing condition for a variety of copy film materials. Neutral density wedge 122 is affixed to a shaft 126 which is rotatably mounted to a drive 128. Flash tube 106 is mounted to a housing 130 via a support 132 and driver 128 is affixed to housing 130 via a mounting member 134. Housing 130 is provided with a plurality of optical baffles 136 which prevent light reflected from the sidewalls of the housing from reaching platen 108. In one form, exposure platen 108 is a plane-parallel optical glass window having a mask 138 for specifying the exposure area to be printed.

Cushion 20, for example, a black dome shaped air bag composed of an elastomeric material, alternates between engaged and disengaged positions, engagement and disengagement being shown by dashed and solid lines, respectively. Air bag 20 is mounted on a slidable platform 144 which is affixed to one end of a shaft 146. Angular position of a servo 147 is translated into linear displacement of shaft 146 via a cam follower 148 and a cam 150, cam follower 148 being affixed to the free end of shaft 146 and cam 150 being drivingly connected to servo 147. Air bag 20 is engaged during the exposure portion of the printing cycle and is disengaged during the film advance portion of the printing cycle. It will be readily appreciated that, in alternative embodiments, air bag 20 is other than cam driven, for example air bag 20 is urged into engagement and disengagement in response to a pressure and a vacuum, respectively.

Reel servo subsystem 22 is comprised of a supply spool 152, a take-up spool 154 and vacuum wells 156, 158. Spools 152 and 156, rotatably mounted to a base 159, are provided for supplying and collecting of negative 10, respectively. Vacuum wells 156 and 158, mounted substantially parallel to and on opposite sides of housing 130, are provided for maintaining a constant tension in negative 10 by application of a constant pressure differential between the partially evacuated well and ambient. Thus, when negative 10 is suddenly drawn into a print gate shown at 160 in response to rotation of drive capstan 26, negative 10 is drawn from a dancer loop 162 and feed into a dancer loop 164. The large inertia of supply spool 152 and take-up spool 154 do not effect the transport of negative 10 in print gate 160 since servos 166 and 167 which drive supply spool 152 and take-up spool 154, respectively, reach operating speed within the time provided by the slack in the dancer loops. In effect, negative 10 is suspended between two vacuum tensioning devices. During the critical part of the negative 10 advance cycle, when film feed servo 14 is seeking its index position, the pressure differential between wells 156, 158 is substantially zero, whereby there is minimum unbalance tension to perturb the film feed servo. The position of each of the dancer loops is sensed by a plurality of sensor switches 168. The signals at the output of the sensor switches are applied to the correlative spool servo, in consequence the spool is either driven at full torque or it is braked, depending upon the position of the dancer loop with respect to the particular sensor switch. In addition, sensor switches 170 are provided for limit purposes in the event there is a failure in the reel servo. Reel servo subsystem 24, the copy film counterpart of reel servo subsystem 22, is comprised of a supply spool 172, take-up spool 174, vacuum wells 176, 178, and servos 179 and 181 which correspond to supply spool 152, take-up spool 154, vacuum wells 156, 158, and servos 166 and 167, respectively.

In the illustrated embodiment, negative 10 from supply spool 152 is threaded sequentially in a path defined by an idler 226, vacuum well 156, idler capstan 28, platen 108, drive capstan 26, vacuum well 158, and idler 228 and take-up spool 154. Copy film 12 from supply 172 is threaded sequentially in a path defined by an idler 230, vacuum well 176, idler capstan 36, platen 108, drive capstan 34, vacuum well 178, and idler 232 and up spool 174.

A lateral drive system 180, illustrated in FIG. 5, is provided for aligning the part of the negative to be printed with the copy film. The negative servo subsystem includes film feed servo 14 and reel servo 22 and the copy film servo subsystem includes film feed servo 16 and reel servo 24, the negative servo and the copy film servo subsystem being shown at 181 and 182, respectively. It will be readily appreciated that proper alignment between the negative and copy film servo subsystems can be achieved by lateral movement of one of the subsystems while the other subsystem remains in a fixed position. For convenience, in the illustrated embodiment, the negative servo subsystem is stationary and the copy film servo subsystem is slidable. The copy film servo subsystem is mounted on a frame 184 which is affixed to a carriage 186 having substantially perpendicular supports 188, 190 at opposite sides thereof. Support 188 is formed with a circular opening 192 and support 190 is formed with a circular opening 194, each of the openings slidably receiving a rod 196. The negative servo subsystem is mounted on a frame 198 which is affixed to a platform 200 having substantially perpendicular supports 202, 204 at opposite sides thereof. Support 202 is formed with a circular opening 206 and support 204 is formed with a circular opening 208, opposite ends of rod 196 being secured in openings 206 and 208. A drive motor 210 is mounted on a base 212 via brackets 214 and 216, base 212 being affixed to platform 200 via a support 218. Also mounted on base 212, is a clutch assembly 220 which is drivingly connected to motor 210 via a connecting rod 222. Clutch assembly 220 is drivingly connected to frame 184 via a drive screw 224 whereby the copy film servo subsystem is slidable in a forward and reverse direction.

Reference is now made to the block diagram of FIG. 2 for a detailed description of the printer operation. Negative material 10 is supplied from spool 152 and is drawn through printing gate 160 by the precisely controlled drive capstan 26. Following the printing, the negative is collected on take-up spool 154. Vacuum wells 156 and 158 on either side of printing gate 160 provide constant tension of negative material 10 in the printing area. Copy film 12 is supplied from spool 26 and is drawn through printing gate 160 by the precisely controlled drive capstan 34. Following the printing, copy film 12 is collected on a take-up spool 174. Vacuum wells 176 and 178 on either side of printing gate 160 provide constant tension on copy film 12 in the printing area. As will be noted, the motion of copy film is controlled in a similar manner as negative 10 and is independent of the movement of the negative so that any desired number of prints can be made from any part of the negative.

The sequence of events of the printer is such that after both negative and copy films have come to rest, air bag 20 presses the two films together against platen 108, and flash lamp 106 makes the exposure. A frame mark reader 234 and a frame edge detector 236 scan the original negative and identify the desired frame before it enters printing gate 160. Light images generated by a chip identification system 238 are conveyed to platen 108 via light pipes 240 during the exposure cycle, whereby an information code is reproduced on the copy film. A sequencer 252, which receives timing signals from a clock 253, controls the sequence of operation of the various control loops and functional units hereinafter described.

An EXECUTE signal as at the input of sequencer 252 initiates the sequencing; feedback signals from the various subsystems step the unit through its states; and at the termination of the program built into the printer, a READY signal is applied to an information source 254 that another set of instructions is needed. An input decoder 256 and an output encoder 258 monitor the information flow in and out of the printer. Input decoder 256 identifies input messages, provides routing circuitry, and performs necessary code translations. A manual input panel 260, having a switch matrix 262 is provided for supplying a digital code to information source 254. The digital code placed in information source 254 is stored in registers (not shown) and is transferred into the printer only after the READY signal from the sequencer has been received by source 254. The transfer of information into the printer leaves the contents of the registers in the source undisturbed. The printing instructions for the next target can be a revision of those instructions already in the source, so that information can be placed into the information source while the printer is executing the previous set of instructions.

Copy film 12 is advanced through printing gate 160 in the manner hereinafter described. Signals as at the output of setup switches 264 are applied to a step generator 266 via a step register 268. An enable signal from sequencer 252 is applied to generator 266 whereby a digital signal is applied to a digital angle comparator 270 which receives also up line, zero index, and down line signals from encoder 40. The digital signals as at the output of comparator 270 are applied to an analog servo loop 272 via a digital to analog decoder 274. Analog servo loop 272, which includes an amplifier 276 and a tachometer 278 for providing a rate feedback to amplifier 276 via a summing junction 280, generates signals for controlling drive capstan 34.

The control system for advance of negative 10 includes a roll number register 282, an exposure register 284, a target register 286, a next frame register 288, a next position register 290, a present frame register 292, present position register 294, digital comparator 296, comparator 298, frame search 300, switch positioning 302, a digital to analog decoder 304 and an analog servo loop 306. Drive capstan 26 is controlled by servo loop 306 which includes an amplifier 308 and a tachometer 310 for providing a rate feedback to amplifier 308 via a summing junction 312. The signals as at the output of decoder 256 are applied to roll number register 282, exposure register 284, target register 286, next frame register 288 and next position register 290. The signals as at the output of sequencer 252 input chip identification 238, exposure register 284, flash lamp 106, present position register 294 and switch positioning 302. A character setup signal from chip identification 238, a frame found signal digital comparator 296 and a position signal from comparator 298 are applied to sequencer 252 as feedback signals.

As previously stated, a specific frame in negative 10 is located by means of frame mark reader 234 and frame edge detector 236. In addition, frame mark reader 234 and frame edge detector 236 provide output signals for determining the distance from the beginning of a specific frame to the area to be printed and placing this area in the print gate. It is assumed that each frame has an optically detectable mark, for example a coded number, located at some definite point with respect to the beginning of the frame. As the negative advances, each frame is detected, identified, and its number entered in present frame register 292. This number is then compared with the number in next frame register 288 in digital comparator 296 with either of two results:

1. If the present frame number is less than the next frame number, the negative continues to advance in the same manner.

2. If the present frame number is the same as the nest frame number (i.e., the desired frame has been reached), then the servo system begins to measure off the correct distance within the frame of the material to be printed.

When the printer is seeking a specified part of the negative, an output signal from sequencer 252 is applied to switch positioning 302 in consequence the signal as at the output of comparator 298 inputs digital to analog decoder 304 via frame search 300. The signal as at the output of next position register 290 and the signal as at the output of present position register 294 are applied to comparator 298. When the specified part of the negative has reached the printing gate, a feedback signal from comparator 298 is applied to sequencer 252, in consequence the output of comparator 298 is disconnected from digital to analog decoder 304.

As previously stated, the purpose of the chip identification system is to provide a photographic identification record on every chip reproduced. In the preferred embodiment, to minimize the possibility of identification error, the identification exposure takes place concurrently with the photographic exposure and while the film is in the printing gate, an identification digit from a flash lamp and masking system (not shown) in chip identification 238 is conveyed to platen 108 via light pipes 240. In one example, each of light pipes 240 is a coherent bundle of plastic fibers; in another example light pipes 240 is a coherent bundle of glass fibers. When chip printing is desired, the operation of the printer is basically the same as previously described the following information items being required:

1. the frame in which the target is located;
2. the position of the target in a frame;
3. the exposure with which a chip is to be printed;
4. the number of copies to be made at the target location;
5. the information to be printed on the border of the chip for identification purposes;
6. the roll number; and
7. the target number.

The above information items are provided by the correlative registers which are inputed by sequencer 252.

In an optional embodiment, the printer receives input information from an external source 312, for example a computer, paper tape, magnetic tape and the like. The signals from source 312 are applied to input decoder 256 via a signal matching subsystem 314 and a switch 316.

Since certain changes may be made in the foregoing disclosure without departing from the scope of the invention involved, it is intended that all matter contained in the above description and depicted in the accompanying drawings be construed in an illustrative and not in a limiting sense.

What is claimed is:

1. A high resolution photographic printing system for reproducing a photographic transparency on copy film, said system comprising:
   a. first servo means engagingly connected to said photographic transparency for selective advancement thereof;
   b. second servo means engagingly connected to said copy film for selective advancement thereof;
   c. exposure means in registration with said photographic transparency and copy film for making an exposure;
   d. cushion means engagingly and disengagingly communicating with said photographic transparency and copy film, said copy film bearing against said photographic transparency when said cushion means is engaged;
   e. programming means electrically connected to said first servo means, second servo means, exposure means and cushion for selective control thereof, said first servo means advancing said photographic transparency in response to signals as at the output of said programming means, said second servo means advancing said copy film in response to signals as at the output of said programming means, said cushion pressing said photographic transparency and copy film against each other when said photographic transparency and copy film are advanced to a selected position, said exposure means making an exposure when said cushion means has been engaged; and
   f. chip identification means operatively connected to said programmer means for generating images representing an identification code, said images conveyed to said copy film for identification thereof.

2. The system as claimed in claim 1 wherein said first servo means comprises a drive capstan, said drive capstan including:
   a. a stator having an axially extending cylindrical portion formed with a core, the other surface of said extending portion formed with an arcuate recess;
   b. a rotor having an extending cylindrical portion, said rotor portion extending coaxially and concentrically through said core; and
   c. a sleeve, formed with at least one port, affixed to said rotor portion, a longitudinal extending arcuate chamber being formed between said arcuate recess and sleeve, said port communicating with said chamber.

3. The system as claimed in claim 1 wherein said first servo means comprises an idler capstan, said idler capstan including:
   a. a longitudinally extending cylindrical member formed with a core and an aperture, the outer surface of said member formed also with an arcuate recess;
   b. a plug affixed to said member, one end of said core being sealed by said plug and
   c. a sleeve, formed with at least one port, affixed to said member, a longitudinally extending arcuate chamber being formed between said arcuate recess and said sleeve; said core, aperture, chamber and port defining a continuous passageway.

4. The system as claimed in claim 1 wherein said cushion means includes:
   a. a slidable platform;
   b. an air bag affixed to one facet of said platform;
   c. a shaft, one end of which is operatively connected to an opposite facet of said platform;
   d. a cam follower affixed to the other end of said shaft;
   e. a cam engagingly connected to said cam follower; and
   f. means for driving said cam, said air bag being urged into contiguity with said copy film when said driving means is engaged, said air bag being withdrawn out of contiguity with said copy film when said driving means is disengaged.

5. The system as claimed in claim 1 wherein said system includes third servo means operatively connected to said second servo means for moving said second servo means with respect to said first servo means for positioning said copy film in registration with said photographic transparency.

6. The system as claimed in claim 1 wherein said exposure means includes:
   a. a support;
   b. an exposure platen affixed to said support;
   c. a lamp;
   d. means electrically connected to said lamp for energizing said lamp;
   e. a diffusing chamber formed with an aperture in register with said exposure platen, said chamber mounted to said support, said lamp being mounted within said chamber; and
   f. optical means formed with a plurality of openings and mounted to said support in register with said lamp and platen.

7. A high resolution photographic printing system for reproducing original negatives on copy film, said system comprising:
   a. a base;
   b. a lamp affixed to said base;
   c. an exposure platen affixed to said base in register with said lamp; responsive to signals as at the output of said sequence.

8. The system as claimed in claim 7 wherein said system includes third servo means affixed to said base and operatively connected to said second servo means for for moving said second servo means with respect to said first servo means for positioning said copy film in registration with said photographic transparency.

9. The system as claimed in claim 7 wherein said cushion means includes:
   a. a slidable platform;
   b. an air bag affixed to one facet of said platform, said air bag being in register with said platen; and
   c. means for sliding said platform, said air bag being urged into and out of contiguity with said platen in response to the slidable movement of said platform, said copy film and negative being pressed against said platen when said sliding means is energized, said copy film and negative being out of contact with one another when said sliding means is de-energized.

10. A high resolution photographic printing system for reproducing original negatives on copy film, said system comprising:
   a. a base;
   b. a lamp affixed to said base;
   c. an exposure platen affixed to said base in register with said lamp;
   d. first servo means operatively connected to said base for advancing and positioning said negative with respect to said platen;
   e. second servo means operatively connected to said base for advancing and positioning said copy film with respect to said platen;
   f. cushion means operatively connected to said base for pressing said negative and copy film against said platen when energized, said negative and copy film being positioned between said platen and cushion means;
   g. vacuum means operatively connected to said negative and copy film, said vacuum means maintaining tension on the negative and copy film;
   h. sequencer means electrically communicating with said lamp, first and second servo means, cushion means and vacuum means for controlling the sequence of operation of the system;
   i. chip identification means for generating light images representing an identification code, said chip identification means being electrically connected to said sequencer; and
   j. a plurality of light pipes, one end of each of said light pipes optically communicating with said chip identification means, the other end of said light pipes being in register with said exposure platen, said light images being conveyed to said copy film via said light pipes;

k. said cushion means being energized when the negative and copy film are positioned on said platen, said cushion means being deenergized when either said negative or copy are in motion, said cushion means being responsive to signals as at the output of said sequence.

11. A high resolution photographic printing system for reproducing a photographic transparency on copy film, said system comprising:
   a. an exposure platen;
   b. first servo means engagingly connected to said photographic transparency for selectively advancing said photographic transparency across said platen;
   c. second servo means engagingly connected to said copy film for selectively advancing said copy film across said platen;
   d. vacuum well means disposed on opposite sides of said platen means, said vacuum well means operating to provide a substantially constant tension on said photographic transparency and copy film, said photographic transparency and copy film disposed in a path in said vacuum well means, said path defining a dancer loop;
   e. bearing means engaging and disengaging said photographic transparency and copy film for bearing said photographic transparency and copy film against said platen; and
   f. exposure means in registration with said photographic transparency and copy film for making an exposure; and
   g. control means electrically connected to said first servo means, second servo means, bearing means and exposure means for control thereof.

12. The system as claimed in claim 11 including sensor means operatively connected to said vacuum well means for sensing the position of said photographic transparency and copy film in said vacuum means.

* * * * *